United States Patent
Yao et al.

(10) Patent No.: US 12,356,335 B2
(45) Date of Patent: Jul. 8, 2025

(54) METHOD AND APPARATUS FOR DETERMINING TRANSMISSION PARAMETER, METHOD AND APPARATUS FOR DETERMINING TRANSMISSION POWER, METHOD AND APPARATUS FOR DETERMINING PHR, AND STORAGE MEDIUM

(71) Applicant: ZTE Corporation, Guangdong (CN)

(72) Inventors: Ke Yao, Guangdong (CN); Chuangxin Jiang, Guangdong (CN); Bo Gao, Guangdong (CN); Zhaohua Lu, Guangdong (CN)

(73) Assignee: ZTE Corporation, Shenzhen (CN)

( * ) Notice: Subject to any disclaimer, the term of this patent is extended or adjusted under 35 U.S.C. 154(b) by 342 days.

(21) Appl. No.: 17/800,854

(22) PCT Filed: Feb. 9, 2021

(86) PCT No.: PCT/CN2021/076157
§ 371 (c)(1),
(2) Date: Aug. 18, 2022

(87) PCT Pub. No.: WO2021/164634
PCT Pub. Date: Aug. 26, 2021

(65) Prior Publication Data
US 2023/0110740 A1   Apr. 13, 2023

(30) Foreign Application Priority Data
Feb. 18, 2020   (CN) .......................... 202010099958.6

(51) Int. Cl.
*H04W 52/14* (2009.01)
*H04W 52/08* (2009.01)
*H04W 52/36* (2009.01)

(52) U.S. Cl.
CPC .......... *H04W 52/146* (2013.01); *H04W 52/08* (2013.01); *H04W 52/365* (2013.01)

(58) Field of Classification Search
CPC . H04W 52/146; H04W 52/08; H04W 52/365; H04W 52/42; H04W 52/16;
(Continued)

(56) References Cited

U.S. PATENT DOCUMENTS 10,477,484 B2   11/2019   Akkarakaran et al.
11,533,762 B2   12/2022   Kang et al.
(Continued)

FOREIGN PATENT DOCUMENTS

CN   102884844 A   1/2013
CN   107733496 A   2/2018
(Continued)

OTHER PUBLICATIONS

European Search Report for EP Patent Application No. 21757939.0, mailed on Jan. 30, 2024, 11 pages.
(Continued)

*Primary Examiner* — Rownak Islam
(74) *Attorney, Agent, or Firm* — Perkins Coie LLP (57) ABSTRACT

Provided is a method for determining a transmission parameter, including: acquiring a sounding reference signal (SRS) resource set; and determining a transmission parameter of uplink transmission according to at least one channel state information-reference signal (CSI-RS) resource in the SRS resource set. Further provided is a method for determining a transmission power, including: acquiring downlink control information; and determining a transmission power of a second number of uplink transmissions according to a first number of transmission power control (TPC) commands indicated by the downlink control information. Further provided is a method for determining a power headroom
(Continued)

report (PHR), including: in a case that there are multiple uplink transmissions that occupy the same time domain resource in one time period, or there are multiple uplink transmissions with the same starting time, determining a PHR in the time period.

20 Claims, 2 Drawing Sheets

(58) Field of Classification Search
CPC ............. H04W 52/54; H04W 72/1268; H04W 72/231; H04W 72/232; H04L 5/0044; H04L 5/0048; H04L 5/001; H04L 5/0053; H04B 7/022; H04B 7/0404; H04B 7/0413; H04B 7/0456; H04B 7/0426; H04B 17/347
USPC ......................................................... 370/318
See application file for complete search history.

(56) References Cited

U.S. PATENT DOCUMENTS

| | | |
|---|---|---|
| 2011/0249638 A1 | 10/2011 | Jen |
| 2015/0181546 A1* | 6/2015 | Freda ................... H04W 76/14 370/336 |
| 2015/0215877 A1 | 7/2015 | Ahn et al. |
| 2017/0222749 A1 | 8/2017 | Dinan |
| 2017/0223675 A1 | 8/2017 | Dinan et al. |
| 2018/0262993 A1 | 9/2018 | Akkarakaran et al. |
| 2019/0104477 A1 | 4/2019 | MolavianJazi et al. |
| 2019/0173607 A1 | 6/2019 | Liu |
| 2019/0230603 A1* | 7/2019 | Liu ....................... H04W 52/42 |
| 2019/0281562 A1 | 9/2019 | Li et al. |
| 2019/0306801 A1 | 10/2019 | Zhou et al. |
| 2019/0373567 A1 | 12/2019 | Takeda et al. |
| 2020/0322893 A1 | 10/2020 | Yao et al. |
| 2022/0369235 A1* | 11/2022 | Chen .................... H04W 52/146 |

FOREIGN PATENT DOCUMENTS

| | | |
|---|---|---|
| CN | 108134659 A | 6/2018 |
| CN | 109479246 A | 3/2019 |
| CN | 110383904 A | 10/2019 |
| CN | 110383907 A | 10/2019 |
| CN | 110536399 A | 12/2019 |
| CN | 111901021 A | 11/2020 |
| WO | 2020009509 A1 | 1/2020 |

OTHER PUBLICATIONS

Institute for Information Industry (III), "Power control for multi-TRP uplink transmission," 3GPP TSG RAN WG1 Meeting #97, R1-1907372, Reno, USA, May 13-17, 2019, 5 pages.
3GPP TS 38.213 V16.0.0 (Dec. 2019), Technical Specification, 3rd Generation Partnership Project; Technical Specification Group Radio Access Network; NR; Physical layer procedures for control (Release 16), 146 pages.
International Search Report and Written Opinion for International Application No. PCT/CN2021/076157, mailed on May 8, 2021 (9 pages with English translation).
Korean office action issued in KR Patent Application No. 10-2022-7031091, dated on May 21, 2024, 12 pages. English translation included.
ETSI TS 138 211 V15.5.0 (Apr. 2019), Technical Specification, 5G; NR; Physical channels and modulation (3GPP TS 38.211 version 15.5.0 Release 15), 98 pages.
Chinese search report issued in CN Patent Application No. 2020100999586, dated on Apr. 24, 2024, 1 page.

* cited by examiner

METHOD AND APPARATUS FOR DETERMINING TRANSMISSION PARAMETER, METHOD AND APPARATUS FOR DETERMINING TRANSMISSION POWER, METHOD AND APPARATUS FOR DETERMINING PHR, AND STORAGE MEDIUM

CROSS-REFERENCE TO RELATED APPLICATION

The present application is a U.S. National Stage Application filed under 35 U.S.C. 371 based on International Patent Application No. PCT/CN2021/076157, filed Feb. 9, 2021, which claims priority to Chinese patent application with application No. 202010099958.6 filed to the China National Intellectual Property Administration on Feb. 18, 2020, the entire contents of which are incorporated herein by reference.

FIELD

The present disclosure relates to the field of wireless communication networks, for example, to a method and an apparatus for determining a transmission parameter, a method and an apparatus for determining a transmission power, a method and an apparatus for determining a PHR, and a storage medium.

BACKGROUND

One of key features of the New Radio technology (New Radio, NR) of the fifth generation mobile communication system is to support high frequency bands. There are abundant frequency domain resources in high frequency bands, but there is a problem of fast wireless signal attenuation and small coverage resulted. Transmitting signals in a beam mode can concentrate energy in a relatively small spatial range and solve the problem of coverage of high-frequency signals. In a beam scenario, as time and location change, a beam pair between a base station and a UE (User Equipment) may also change. Therefore, a flexible beam update mechanism is required. The NR technology can support a basic beam mechanism, however, related art does not provide a solution to the problem related to power control in a multi-antenna panel (plane)/multi-TRP (Transmit-Receive Point) scenario.

SUMMARY

The present disclosure provides a method and an apparatus for determining a transmission parameter, a method and apparatus for determining a transmission power, a method and apparatus for determining a PHR, and a storage medium.

Embodiments of the present disclosure provide a method for determining a transmission parameter, including: acquiring a sounding reference signal SRS resource set; determining a transmission parameter of uplink transmission according to at least one channel state information-reference signal CSI-RS resource in the SRS resource set, where, the transmission parameter includes precoding information, and the uplink transmission includes a SRS transmission or a physical uplink shared channel PUSCH transmission.

Embodiments of the present disclosure provide a method for determining a transmission power, including: acquiring downlink control information; determining transmission powers of a second number of uplink transmissions according to a first number of transmit power control TPC commands indicated by the downlink control information, where an uplink transmission of the second number of uplink transmissions includes a physical uplink shared channel PUSCH transmission, a physical uplink control channel PUCCH transmission, or a sounding reference signal SRS transmission.

Embodiments of the present disclosure provide a method for determining a power headroom report PHR, including: in a case where there are more than one uplink transmissions that occupy the same time domain resource in one time period, or there are more than one uplink transmissions with the same starting time, determining a PHR in the time period with at least one of following manners: determining the PHR in the time period according to a sum of transmission powers of the more than one uplink transmissions; determining the PHR corresponding to each antenna panel or each transmit-receive point in the time period; determining the PHR in the time period according to a transmission power of the uplink transmission corresponding to each transmit-receive point direction; determining the PHR in the time period according to a parameter associated with the uplink transmissions; where, the time period includes at least one time unit, and the time unit includes a time slot, a subframe, a frame or a symbol.

Embodiments of the present disclosure provide an apparatus for determining a transmission parameter, including: a first acquisition module and at least one processor.

The first acquisition module is configured to acquire a sounding reference signal SRS resource set; at least one processor is configured to: determine a transmission parameter of uplink transmission according to at least one channel state information reference signal CSI-RS resource in the SRS resource set, where the transmission parameter includes precoding information, and the uplink transmission includes a SRS transmission or a Physical uplink shared channel PUSCH transmission.

Embodiments of the present disclosure provide an apparatus for determining a transmission power, including: a second acquisition module and at least one processor.

The second acquisition module is configured to acquire downlink control information; at least one processor is configured to: determine transmission powers of a second number of uplink transmissions according to a first number of transmit power control TPC commands indicated by the downlink control information, where the uplink transmission includes a physical uplink shared channel PUSCH transmission, a physical uplink control channel PUCCH transmission, or a sounding reference signal SRS transmission.

Embodiments of the present disclosure provide an apparatus for determining a power headroom report PHR, including at least one processor. The at least one processor is configured to: in a case where there are more than one uplink transmissions that occupy the same time domain resource in one time period, or there are more than one uplink transmissions with the same starting time, determine a PHR in the time period with at least one of following manners: determining the PHR in the time period according to a sum of transmission powers of the more than one uplink transmissions; determining the PHR corresponding to each antenna panel or each transmit-receive point in the time period; determining the PHR in the time period according to a transmission power of the uplink transmission corresponding to each transmit-receive point direction; determining the PHR in the time period according to a parameter associated with the uplink transmissions; where, the time period includes at least one time unit, and the time unit includes a time slot, a subframe, a frame or a symbol.

Embodiments of the present disclosure provide a storage medium storing a computer program executed by a processor to implement any one method in embodiments of the present disclosure.

DETAILED DESCRIPTION OF EMBODIMENTS

Hereinafter, the embodiments of the present disclosure will be described with reference to drawings.

In a wireless communication system, in order to reduce the power consumption of a transmitting device and reduce the interference caused by unnecessary high-power transmission to other transmissions, it is necessary to control a transmission power of transmission. The size of a communication range, the maximum transmission power and reception sensitivity of a transceiver device on both sides of the communication, a modulation and coding method and rate of data, a working frequency band, and bandwidth occupied by the transmission will all affect the transmission power.

In general communication technologies, a power control includes an open-loop power control and a closed-loop power control.

The open-loop power control refers to a power control based on a PL (Path Loss), that is, a first communication node sends a reference signal and a second communication node measures the PL from the first communication node to the second communication node according to the reference signal. The PL is a difference between the transmission power at which a reference signal is sent by the first communication node and the receiving power at which a reference signal is received by the second communication node. Assuming that the PL of transmission from the second communication node to the first communication node is the same as that of transmission from the first communication node to the second communication node, and the second communication node can use the above the PL to calculate a transmission power of the transmission between the second communication node as a transmission node to the first communication node. Since the PL is a one-sided measurement result, the PL is an open-loop part of the transmit power control.

The closed-loop power control means that the first communication node performs analysis after receiving transmission and provides power adjustment information to the second communication node according to received quality.

A transmission power of a downlink is determined by a base station according to channel measurement results of one or more scheduling user equipment (or referred to as UE) and a scheduling algorithm, and a transmission power of an uplink is determined with a combination of open-loop power control and closed-loop power control. In addition, the transmission power is also related to specific quantities related to the transmission, such as transmission rate, a Modulation and Coding Scheme (MCS) level, transmission bandwidth, and the like.

In the 5th Generation mobile communication system (5G) technology, power control of uplink transmission is at the Bandwidth Part (BWP) level, that is, the transmission power is determined respectively for uplink transmission at each BWP level.

5G technology introduces a beam transmission method, and both a base station and a UE support multiple beams. In a case where in a beam mode, power calculations need to take the characteristics of the beam into account. Resources used for path loss measurement in 5G are related to beams of transmission paths and need to be configured by a base station, so path loss measurement parameters exist independently of open-loop power parameters and closed-loop power parameters.

A base station configures uplink transmission to indicate reference signal resources for the UE, so that the UE obtains a power control parameter associated with the reference signal resources.

Exemplarily, a base station configures a Sounding Reference Signal resource set (SRS resource set) of uplink transmission for the UE. A base station configures a transmission mode of uplink transmission for the UE, such as a codebook based transmission, or a non-codebook based transmission. In an embodiment of the present disclosure, the uplink transmission includes at least one of the following: a sounding reference signal SRS transmission and a physical uplink shared channel PUSCH transmission.

A base station sends Downlink Control Information (DCI) to UE, the DCI includes an SRS Resource Indicator (SRI) used to determine preprogrammed information of the PUSCH transmission. The SRI sets indicated in the DCI of the different PUSCH transmission modes may be different.

Uses of a Sounding Reference Signal resource set (SRS resource set) include a beam management BM, an antenna switching AS, a codebook or a non-codebook. In the related art, a CSI-RS resource is configured in a SRS resource set; in the case of the non-codebook based transmission, the CSI-RS resource is used by the UE to measure a downlink channel to determine a transmission parameter of an uplink transmission, such as precoding information, etc. However, in a multi-TRP or multi-panel scenario, multiple TRPs or panels share one SRS resource set, and how determining a transmission parameter of uplink transmission becomes an urgent problem to be solved. In order to solve the above problem, embodiments of the present disclosure provide a method for determining a transmission parameter.

Figure 1:
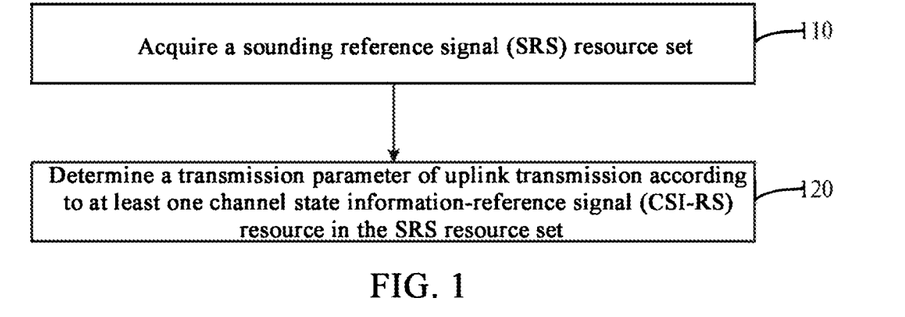
FIG. 1 is a flowchart of a method for determining a transmission parameter according to an embodiment of the present disclosure.

FIG. 1 is a flowchart of a method for determining a transmission parameter according to an embodiment of the present disclosure. The method may be performed by an apparatus for determining a transmission parameter, and the apparatus may be implemented by software and/or hardware, and is typically integrated within the UE. As shown in FIG. 1, the method includes the following:

S110: a sounding reference signal SRS resource set is acquired.

In this embodiment of the present disclosure, the SRS resource set includes at least one channel state information reference signal (CSI-RS) resource.

Use of the SRS resource set is non-codebook. The CSI-RS resource is used to determine a transmission parameter of the uplink transmission. The uplink transmission is non-codebook based transmission, which may also be referred to as non-codebook based transmission.

S120: a transmission parameter of uplink transmission is determined according to the at least one channel state information-reference signal CSI-RS resource in the SRS resource set.

In this embodiment of the present disclosure, the uplink transmission includes a SRS transmission or a physical uplink shared channel PUSCH transmission. The transmission parameter includes precoding information. For example, the transmission parameter includes precoding information of a sounding reference signal (SRS) resource set, or precoding information of a physical uplink shared channel (PUSCH) transmission.

For example, the UE determines the precoding information of the SRS resources in the SRS resource set according to the CSI-RS resources in the SRS resource set.

Alternatively, the UE determines the precoding information of the PUSCH transmission according to the precoding information of the SRS resources referenced by the PUSCH transmission. The SRS resource referenced by the PUSCH transmission refers to: the SRI included in the DCI for scheduling or triggering the PUSCH transmission, or the SRS resource indicated by the SRI included in the high-layer signaling for configuring the PUSCH transmission.

In an embodiment of the present disclosure, in a case where a setting condition is satisfied, the maximum value of the number of the channel state information reference signal CSI-RS resource included in the sounding reference signal resource set is greater than 1. For example, the number of CSI-RS resources included in the SRS resource set is two.

The setting condition includes at least one of the following:

The number of CORESET pools (ControlResourceSet pool) of the first communication node exceeds 1; or, CORESET (ControlResourceSet) of the first communication node includes more than one serial numbers of different CORESET Pools; or, the number of Transmit-Receive Points TRPs or the maximum number of TRPs of the second communication node exceeds 1. For example, the CORESET or CORESET pool of the first communication node is configured by the second communication node.

Exemplarily, the first communication node may be UE, a terminal, or a user, and the second communication node may be a base station, a network side (network), or an NB (i.e. NodeB, including an evolved NodeB (eNB)) and a next generation NodeB (gNB), etc.). The meaning of the number of TRPs of the second communication node is the number of TRPs currently in use. The meaning of the maximum number of TRPs of the second communication node is the maximum number of TRPs that the base station can support.

Exemplarily, the CORESET of the first communication node includes serial numbers of two different CORESET Pools, and the serial number of each CORESET Pool may correspond to one TRP. The CORESET of the first communication node is included in the configuration information PDCCH-Config of a PDCCH (Physical Downlink Control Channel).

In this embodiment of the present disclosure, the at least one CSI-RS resource has at least one of the following characteristics:

The CSI-RS resource is a non zero power (NZP) CSI-RS resource.

The CSI-RS resource is associated with setting information including one of the following: a SRS resource, a SRS resource group, a CORESET pool, a CORESET pool group, a serial number of a CORESET pool, a Transmission Configuration Indicator state (TCI state), or a TCI state group.

The setting information is configured to the first communication node, or configured or indicated to the uplink transmission of the first communication node. The uplink transmission includes: PUSCH transmission, PUCCH transmission, or SRS transmission. The setting information is limited to a specific frequency domain. The specific frequency domain includes: RB (Resource Block), RBG (RB Group), a cell, CC (Component Carrier), BWP (BandWidth Part), a cell or a CC group, SUL/UL (Supplementary Uplink/Uplink), FR1 (Frequency Rangel, Frequency Range 1) or FR2, etc.

The CSI-RS resource is associated with the SRS resource or the SRS resource group. For example, one CSI-RS resource is associated with one SRS resource or SRS resource group.

The CSI-RS resource is associated with the CORESET pool or the CORESET pool group. For example, one CSI-RS resource is associated with one CORESET pool or one CORESET pool group.

The CSI-RS resource is associated with the serial number of the CORESET pool. For example, one CSI-RS resource is associated with the serial number of one CORESET pool.

The CSI-RS resource is associated with the TCI state or the TCI state group. For example, a CSI-RS resource is associated with one TCI state or one TCI state group.

In an example implementation, the CSI-RS resource is associated with a reference signal RS or a reference signal RS group. For example, one CSI-RS resource is associated with one RS or RS group.

The CSI-RS resource is associated with a downlink beam or a beam group. For example, one CSI-RS resource is associated with one downlink beam or one beam group.

The CSI-RS resource is associated with an uplink beam or a beam group. For example, one CSI-RS resource is associated with one uplink beam or one beam group.

The CSI-RS resource is associated with an antenna panel. For example, one CSI-RS resource is associated with one antenna panel.

The transmission parameter of the uplink transmission being determined according to the at least one CSI-RS resource in the SRS resource set includes at least one of the following:

The precoding information of the uplink transmission corresponding to one SRS resource is determined according to one CSI-RS resource; the precoding information of the uplink transmission corresponding to one SRS resource is determined according to more than one CSI-RS resource; the precoding information of the uplink transmission corresponding to the SRS resource is determined according to the association relationship between the CSI-RS resource and the setting information.

The setting information includes one of the following: a SRS resource, a SRS resource group, a CORESET pool, a CORESET pool group, a serial number of a CORESET pool, a Transmission Configuration Indicator state (TCI state), or a TCI state group. For example, a CSI-RS resource used for transmission corresponding to the SRS resource is determined according to the association relationship between the CSI-RS resource and the SRS resource group. Alternatively, the CSI-RS resource is used to determine precoding information of transmission corresponding to the SRS resource or the SRS resource group depends on the UE.

In a solution of the embodiment of the present disclosure, by acquiring a sounding reference signal resource set, and according to at least one channel state information reference signal resource in the sounding reference signal resource set, a transmission parameter of uplink transmission is determined, so as to avoid a problem of disabling determination of a transmission parameter caused by multiple TRPs or panels sharing one SRS resource set, thereby realizing expansion of CSI-RS resources in multi-TRP or panel scenarios.

In an exemplary embodiment, the method further includes: determining at least one CSI-RS resource in the SRS resource set according to downlink control information (DCI). In this embodiment, the downlink control information includes DCI format 0_1, DCI format 0_2, DCI format 1_2, and/or DCI format 1_1.

For example, at least one CSI-RS resource is determined according to a SRS request field in downlink control information. That is, a target SRS resource set is determined according to the SRS request field in the DCI, and at least one CSI-RS resource is determined according to a CSI-RS resource configured in the target SRS resource set. The target SRS resource set is determined by association information between a SRS trigger state and aSRS resource set. The association information between the SRS trigger state and the SRS resource set includes one or more association information, for example, AperiodicSRS-ResourceTrigger, or AperiodicSRS-ResourceTriggerList. The association information between the SRS trigger state and the SRS resource set is configured by higher layer signaling, for example, the higher layer signaling may be Radio Resource Control (RRC) signaling.

In an exemplary embodiment, in a case where the CSI-RS resource is aperiodic, the at least one CSI-RS resource is in the same time unit as downlink control information including a SRS request field. For example, the time unit includes a slot, a symbol, an Orthogonal Frequency Division Multiplexing (OFDM) symbol, a radio frame, a physical frame, a subframe, or a traditional time unit (such as seconds, milliseconds, microseconds) seconds, or nanoseconds), etc.

In an exemplary embodiment, in a case where resources occupied by more than one CSI-RS resources within one slot are overlapped, the more than one CSI-RS resources are allocated to different time units according to a number sequence of the CSI-RS resources.

For example, DCI is sent on a slot n, and the DCI includes the SRS request field. The SRS resource set corresponding to this field includes two CSI-RS resources, numbered #3 and #5 respectively, and RE resource element positions occupied by the two CSI-RS resources overlap, and therefore the CSI-RS resources cannot be sent on a slot. According to the number sequence of CSI-RS resource, the CSI-RS resource numbered #3 is processed first, and the CSI-RS resource numbered #3 is sent on slot n; and then the CSI-RS resource numbered #5 is processed, a first slot that can accommodate the CSI-RS resource numbered #5 is found after the slot n, the first slot is set as a slot n+x, and the CSI-RS resource numbered #5 is sent on the slot n+x, where n and x are integers.

Alternatively, the DCI is sent on the slot n, and the DCI includes a SRS request field, and the SRS resource set corresponding to this field includes three CSI-RS resources, numbered #3, #5 and #6 respectively, where RE positions occupied by the CSI-RS resources numbered #3 and #5 overlap, so the CSI-RS resources numbered #3 and #5 cannot be sent on one slot, but the RE positions occupied by the CSI-RS resources numbered #3 and #6 do not overlap. According to a number sequence of the CSI-RS resources, the CSI-RS resource numbered #3 is processed first, and the CSI-RS resource numbered #3 is sent on the slot n. Since the CSI-RS resource numbered #5 cannot be sent with the CSI-RS resource numbered #3 in the same slot, it is necessary to re-determine a slot for #5, but the CSI-RS resource numbered #6 and the CSI-RS resource numbered #3 can be sent in the same slot, and thereby the numbering #3 and number #6 are sent on the slot n. A first slot that can accommodate the CSI-RS resource numbered #5 is found after the slot n, and the first slot is set as a slot n+x, and the CSI-RS resource numbered #5 is sent on the slot n+x, where n and x are integers.

In an exemplary embodiment, the method also includes the following:

In a case where a time interval between a reception time of a last symbol of at least one CSI-RS resource in the SRS resource set and a start time of the SRS transmission is less than a predetermined time interval, the precoding information of the SRS transmission remains unchanged. For example, maintaining the same can also be understood as not updating the precoding information of the SRS transmission. The time interval is N time units, where N is an integer. The time unit includes a slot, a symbol, an OFDM (Orthogonal Frequency Division Multiplexing) symbol, a radio frame, a physical frame, a subframe, or a conventional time unit such as seconds, milliseconds, microseconds, nanoseconds, and the like. For example, the predetermined time interval is 3 slots, or 42 symbols.

The CSI-RS resource is aperiodic.

The SRS transmission is aperiodic.

In an exemplary embodiment, in a case where the SRS resource set is periodic or semi-persistent, at least one CSI-RS resource is configured by higher layer signaling.

In an exemplary embodiment, in a case where the SRS resource set is periodic or semi-persistent, a RE position occupied by at least one CSI-RS resource is not conflict.

For PUSCH transmission whose transmission configuration parameter (txConfig) is a non-codebook, the precoding is the same as a precoding matrix of a SRS indicated by a SRI field or a TCI state field included in a DCI that schedules or activates the PUSCH transmission.

In an exemplary embodiment, for the second communication node, the configured SRS resource set includes at least one CSI-RS resource, and the CSI-RS is sent to the first communication node according to a CSI-RS resource. Exemplarily, in a case where the number of transmit-receive points TRPs or the maximum number of TRPs of the second communication node exceeds 1, the maximum value of the number of CSI-RS resources included in the configured SRS resource set is greater than 1. In a case where the number of transmit-receive points TRPs or the maximum number of TRPs of the second communication node exceeds 1 (for example, the maximum number of TRPs may be 2), the maximum value of the number of CSI-RS resources included in the configuration SRS resource set is greater than 1 (For example, the number of CSI-RS resources is 2).

At least one channel state information reference signal CSI-RS resource has at least one of the following characteristics:

The CSI-RS resource is a non-zero power channel state information reference signal resource; the CSI-RS resource is associated with setting information including one of the following: a SRS resource, a SRS resource group, a CORESET pool, a CORESET pool group, a transmission configuration indication state TCI state, or a TCI state group.

In an example implementation, in a case where CSI-RS resource is aperiodic, at least one CSI-RS resource is in the same time unit as downlink control information including a SRS request field.

In an example implementation, in a case where resources occupied by more than one CSI-RS resources are overlapped within one slot, the more than one the CSI-RS resources are allocated to different time units according to a number sequence of the CSI-RS resources.

In an example implementation, in a case where the SRS resource set is periodic or semi-persistent, at least one CSI-RS resource is configured by higher layer signaling.

In an example implementation, a RE position occupied by at least one CSI-RS resource is not conflict.

Figure 2:
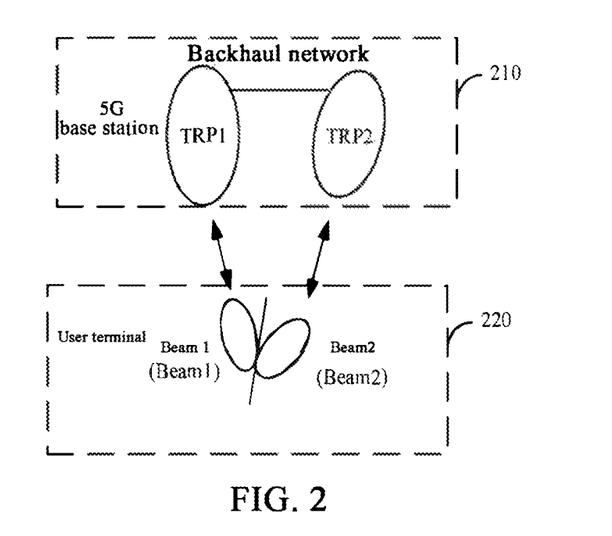
FIG. 2 is a diagram of a multi-TRP-based communication link between a UE and a base station.

FIG. 2 is a diagram of a multi-TRP-based communication link between a UE and a base station. As shown in FIG. 2, a 5G base station 210 is configured with multiple TRPs, and a user terminal 220 (or referred to as UE) can use different beams or different antenna panels to communicate with the multiple TRPs of the base station. Multiple communication between the UE and the different TRPs of the base station may occur at the same time, or may occur at different time. In a case where the base station indicates the UE to receive or send a resource, it may use an independent path, that is, M-DCI (multiple-DCI); or use a single path, that is, S-DCI (single-DCI). During M-DCI, different DCIs are transmitted to the UE from different TRPs respectively. As shown in FIG. 2, DCH is from TRP1 to Beam1, carrying transmitting/receiving information of the TRP1 and/or the Beam1; DCI2 is from TRP2 to Beam2, carrying transmitting/receiving information of the TRP2 and/or the Beam2. During S-DCI, the transmitting/receiving information of the TRP1 and/or the Beam1 and the transmitting/receiving information of the TRP2 and/or the Beam2 are carried in one DCI, that is, transmitted through TRP1 or TRP2. As the S-DCI only includes one closed-loop transmission power control command, that is, a TPC command (Transmit power control command) The related art does not provide a method for determining a transmission power in this case. To solve this problem, an embodiment of the present disclosure provides a method for determining a transmission power.

Figure 3:
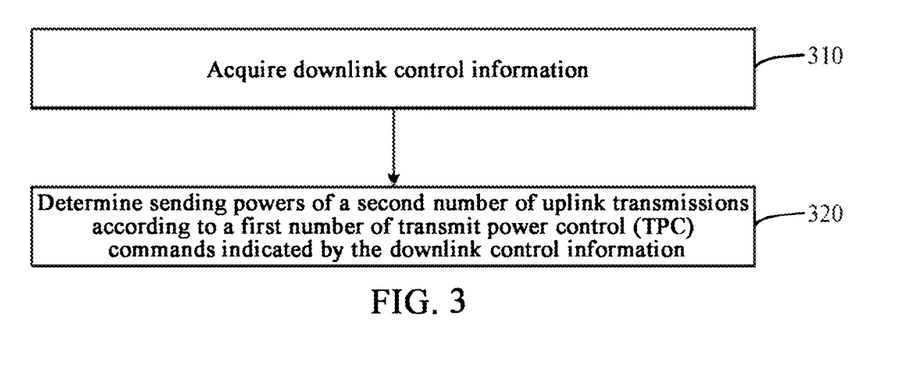
FIG. 3 is a flowchart of a method for determining a transmission power according to an embodiment of the present disclosure.

FIG. 3 is a flowchart of a method for determining a transmission power according to an embodiment of the present disclosure. The method may be performed by an apparatus for determining a transmission power, which may be implemented by software and/or hardware, and is typically integrated in an UE. As shown in FIG. 3, the method includes the following:

S310: downlink control information is acquired.

Exemplarily, a first communication node acquires downlink control information transmitted by a second communication node in real time. The downlink control information includes a DCI, or a PDCCH transmission.

In an embodiment of the present disclosure, the second communication node, after configuring that one downlink control information includes at least one TPC command, transmits the downlink control information Taking DCI as an example, the second communication node configures that one DCI includes at least one TPC command, and different TPC commands are respectively determined according to different TPC command fields.

Assuming that one TPC command requires M bits to indicate, and each M bit represents a TPC command field, then N*M bits are required to indicate the number N of TPC commands, forming the number N of command fields for indicating the number N of TPC commands.

Alternatively, the second communication node configures that one DCI includes at least one TPC command, and different TPC commands are determined according to an integrated TPC command field.

Assuming that one TPC command requires M bits to indicate, the integrated TPC command field includes X bits to indicate the number N of TPC commands, where X takes an value between M and N*M. Each value in the integrated TPC command field with X bits represents one group of TPC commands, corresponding to the number N of TPC commands respectively. The relationship between the value of the X bit and each TPC command is predefined. For example, when N=2, a table extending the value of the TPC command field in DCI has two columns, and the value of each TPC command field corresponds to two TPC commands.

S320: transmission powers of a second number of uplink transmissions are determined according to a first number of transmit power control TPC commands indicated by the downlink control information.

For example, the uplink transmission includes physical uplink shared channel PUSCH transmission, PUCCH (Physical Uplink Control Channel) transmission, or sounding reference signal SRS transmission. The first number is an integer greater than or equal to 1, and the second number is an integer greater than or equal to 1.

In this embodiment of the present disclosure, the second number of uplink transmissions have at least one of the following characteristics:

The second number of uplink transmissions are scheduled or triggered by the same downlink control information; the second number of uplink transmissions include time-domain repeated uplink transmission; the second number of uplink transmissions include uplink transmissions occupying or associated with different transmission resources.

In an embodiment of the present disclosure, transmission resources include: a time domain resource, a frequency domain resource, a spatial domain resource, a beam state, a transmission configuration indication state TCI state, an associated reference signal resource or spatial relationship, a referenced reference signal resource or spatial relationship, etc.

Exemplarily, the transmission powers of the second number of uplink transmissions being determined according to the first number of transmit power control TPC commands indicated by downlink control information includes one of the following:

The transmission power of the respective uplink transmission is determined according to each TPC command; the transmission power of each of the second number of uplink transmissions is determined according to the TPC commands; it is determined that one or one group of the second number of uplink transmissions use the transmission power determined by the TPC command, and the transmission powers of remaining uplink transmissions are determined according to a TPC command being 0; the second number of uplink transmissions including a first number of groups, and the transmission powers of the corresponding group of uplink transmissions are determined according to each TPC command; it is determined that a first number or a first group of the second uplink transmissions use the transmission power determined by the TPC command, and the transmission powers of the remaining uplink transmissions are determined according to a TPC command being 0.

Exemplarily, in a case where the first number is equal to the second number, each transmit power control TPC command corresponds to one uplink transmission, and each uplink transmission is determined according to each TPC command.

In a case where the first number is equal to 1, the transmission power of each uplink transmission of the second number of uplink transmissions is determined according to the TPC command. For example, one DCI includes one TPC command, and each uplink transmission uses the TPC command and a power allocation ratio configured or indicated by a base station to determine the transmission power, where, the power allocation ratio between the second number of uplink transmissions is configured or indicated by the base station.

Alternatively, in the case where the first number is equal to 1, one or one group of uplink transmissions of the second number of uplink transmissions using the TPC command are determined to determine the transmission power, and the transmission powers of the remaining uplink transmissions are determined according to a TPC command being 0. That is, in the case where the acquired DCI includes only one TPC, under a setting rule, it is determined that one or one group of the second number of uplink transmissions use the transmission power determined by the TPC command, and the transmission powers of the remaining uplink transmissions are determined according to a TPC command being 0.

Alternatively, in a case where the first number is less than the second number, the second number of uplink transmissions includes a first number of groups, the transmission power of the corresponding group of uplink transmissions is determined according to each TPC command.

Alternatively, in a case where the first number is less than the second number, it is determined that a first number or a first number group of uplink transmissions of the second number of uplink transmissions use the TPC command to determine the transmission power, and the transmission powers of the remaining uplink transmissions are determined according to a TPC command being 0.

Exemplarily, it is determined that one or one group of uplink transmissions of the second number of uplink transmissions use the TPC command to determine the transmission power according to at least one of the following: a serial number of the uplink transmission; a transmission resource of the uplink transmission; a transmission resource of the downlink control information scheduling or triggering the uplink transmission; a serial number or a search space serial number of a ControlResourceSet pool CORESET pool to which downlink control information scheduling or triggering the uplink transmission belongs; a closed-loop power control serial number of the downlink control information scheduling or triggering the uplink transmission.

Comparing different transmission resources of multiple uplink transmissions or DCI, one or one group, or multiple or multiple groups are determined. For example, it is determined that one or one group of uplink transmissions with the largest SRI among multiple uplink transmissions use a TPC command. Alternatively, it is determined that one or one group of uplink transmissions with the smallest SRI among multiple uplink transmissions use a TPC command. Alternatively, multiple uplink transmissions may use the TPC command in turn, in a predetermined pattern, or in a parity turn, etc.

Exemplarily, determining that one or one group of the second number of uplink transmissions use the transmit power control TPC command is determined according to the transmission resource of the uplink transmission, includes the following: it is determined that one or one group of the second number of uplink transmissions use the transmit power control TPC command according to the serial number of sounding reference signal SRS resource or sounding reference signal resource Indicator SRI of the uplink transmissions. For example, it is determined that the corresponding one or one group with the smallest serial number of the SRI or SRS resources of the second number of uplink transmissions use the transmit power control TPC command. Alternatively, it is determined that the corresponding one or one group with the largest serial number of the SRI or SRS resources of the second number of uplink transmissions use the transmit power control TPC command.

In an exemplary embodiment, it is determined that one or one group of a second number of uplink transmissions use the transmit power control TPC command according to the transmission resource of the downlink control information scheduling or triggering the uplink transmission. In this embodiment, the transmission resources of the downlink control information include: time domain resource information, spatial domain resource information, frequency domain resource information, a serial number of a transmission resource, a serial number of a receiving resource, a serial number of a CORESET pool, a serial number of search space or TPMI (Transmitted Precoding Matrix Indicator), where, the time domain resource information includes: at least one of a frame number, a serial number of a symbol number, or a serial number of a time slot. The spatial resource information includes at least one of a serial number of spatial relationship, a MIMO (Multiple Input Multiple Output) parameter, TPMI (Transmission Precoding Matrix Indication) information, a serial number of a TCI state, or an SRI.

In an example implementation, according to the odd and even characteristics of a transmission resource of the downlink control information scheduling or triggering the uplink transmission, it is determined that one or one group of a second number of uplink transmissions use the transmit power control TPC command. For example, one or one group of the uplink transmissions in which the odd and even characteristics of a serial number (such as a serial number of SRS) of the uplink transmission are consistent with (or opposite to) the odd and even characteristics of a transmission resource of the DCI scheduling or triggering the uplink transmission is determined, and the determined one or one group of uplink transmissions use the transmit power control TPC command.

Alternatively, one or one group of the uplink transmissions in which the odd and even characteristics of a serial number of spatial resource information of the uplink transmission are consistent with (or opposite to) the odd and even characteristics of a transmission resource of the downlink control information scheduling or triggering the uplink transmission is determined, and the determined one or one group of uplink transmissions use the transmit power control TPC command.

Alternatively, an operation result of a modulo N operation of a transmission resource of the DCI scheduling or triggering the uplink transmission is calculated, and it is determined that one or one group in which a transmission serial number of the second number of uplink transmissions is consistent with the operation result use the transmit power control TPC command.

Alternatively, an operation result of a modulo N operation of a transmission resource of the DCI scheduling or triggering the uplink transmission is calculated, an operation result of a modulo N operation of a transmission serial number of the uplink transmission is calculated, and it is determined that one or one group of the second number of uplink transmissions having the same operation results use the transmit power control TPC command.

Alternatively, an operation result of a modulo N operation of a transmission resource of the DCI scheduling or triggering the uplink transmission is calculated, and it is determined that one or one group in which a transmission serial number (or an operation result of a modulo N operation of a transmission serial number) of the uplink transmission has one-to-one relationship with the operation result use the transmit power control TPC command, where, the one-to-one relationship is preset corresponding relationship.

Alternatively, an operation result of a modulo N operation of a transmission resource of the DCI scheduling or triggering the uplink transmission is calculated, and it is determined that one or one group in which a serial number of spatial domain resource information of the uplink transmissions is consistent with the operation result use the transmit power control TPC command.

Alternatively, an operation result of a modulo N operation of a transmission resource of the DCI scheduling or triggering the uplink transmission is calculated, an operation result of a modulo N operation of a serial number of spatial domain resource information of the uplink transmissions is calculated, and it is determined that one or one group of the second number of uplink transmissions having the same operation results use the transmit power control TPC command.

Alternatively, an operation result of a modulo N operation of a transmission resource of the DCI scheduling or triggering the uplink transmission is calculated, and it is determined that one or one group in which a serial number of spatial domain resource information (or an operation result of a modulo N operation of a serial number of spatial domain resource information) of the uplink transmission has one-to-one relationship with the operation result use the transmit power control TPC command.

N in the above modulo operation is the total number of uplink transmissions, that is, the second number.

For example, it is determined that one or one group of uplink transmissions of the second number of uplink transmissions use the TPC command is determined according to a ControlResourceSet pool CORESET pool to which downlink control information scheduling the uplink transmission belongs. For example, according to a serial number of a CORESET pool to which the DCI scheduling the uplink transmission belongs, it is determined that one or one group of the second number of uplink transmissions being consistent with the serial number of the CORESET pool use the transmit power control TPC command.

In another exemplary embodiment, determining that one or one group of the second number of uplink transmissions use the transmit power control TPC command according to a transmission resource of the downlink control information scheduling or triggering the uplink transmission, includes the following: it is determined that one or one group of the second number of uplink transmissions use the transmit power control TPC command according to a closed-loop power control serial number indicated in downlink control information. For example, it is determined that one or one group of the second number of uplink transmissions having the same (or opposite) closed-loop power control serial number use the transmit power control TPC command according to the closed-loop power control serial number indicated in downlink control information.

Exemplarily, it is determined that one or one group of the second number of uplink transmissions use the transmit power control TPC command according to a serial number of the uplink transmission. In an example implementation, the serial number of the uplink transmission may include internal serial numbers of the second number of uplink transmissions. For example, for three uplink transmissions, it is determined that one of the three uplink transmissions uses the TPC command according to the largest serial number of transmission, the smallest serial number of transmission, the serial number of transmission in turn, the serial number of transmission in an order of the predetermined pattern, or the serial number of transmission in a parity turn, etc.

It may be the following: it is determined that one or one group of the second number of uplink transmissions having the smallest serial number of transmission use the transmit power control TPC command. Alternatively, it is determined that one or one group of the second number of uplink transmissions having the largest serial number of transmission use the transmit power control TPC command and the like.

Exemplarily, determining that the one or one group of the second number of uplink transmissions use the transmit power control TPC command according to a preset order includes the following: TPCs in the DCI obtained for multiple times are sequentially cycled for different one or one group of uplink transmissions. Assuming that TPC1-TPC4 are four TPCs sequentially acquired by the UE, for four (or four groups of) uplink transmissions, the first (or group of) uplink transmissions use TPC1 to determine the transmission power, and the second (or group of) uplink transmissions use TPC2 to determine the transmission power, the third (or group of) uplink transmissions use TPC3 to determine the transmission power, and the fourth (or group of) uplink transmission use TPC4 to determine the transmission power.

In the above example, the TPCs are used in turn to determine the transmission power according to a serial number sequence of the uplink transmissions, and the TPCs may also be used in turn to determine the transmission power not according to a serial number sequence of the uplink transmissions. For example, the first (or group of) uplink transmissions use TPC1 to determine a transmission power, the fourth (or group of) uplink transmissions use TPC2 to determine a transmission power, the second (or group of) uplink transmissions use TPC3 to determine a transmission power, and the third (or groups of) of uplink transmissions use TPC4 to determine a transmission power.

In an embodiment of the present disclosure, the serial number of the SRS resource may be used to determine the serial number of the transmission of the uplink transmission.

In a solution of an embodiment of the present disclosure, by acquiring downlink control information, and according to the first number of transmit power control TPC commands indicated by the downlink control information, the transmission powers of the second number of uplink transmissions are determined, so as to solve the problem in the related art that the S-DCI including only one TPC cannot be directly used to determine the transmission power of a multi-TRP/panel scenario and to implement one TPC command in the DCI for application to a multi-channel transmission scenario.

In an exemplary embodiment, the transmission powers of the second number of uplink transmissions are determined according to the TPC command and a power offset value. That is, there is only one TPC in the acquired DCI, and the TPC is used to determine the transmission power of the first transmission, and the transmission powers of the remaining transmissions are greater than or equal to the transmission power of the first transmission, and the power offset values between the remaining transmissions and the first transmission are determined by the higher layer signaling configuration or Medium Access Control (MAC) signaling configuration.

In an exemplary embodiment, one DCI schedules four PUSCH repeated transmissions, and the DCI includes one TPC command field, and the indicated power adjustment is +2 dB. The base station configures a power offset value of 1 dB through high layer signaling or MAC signaling; and then the actual TPC commands of the four transmissions are: +2 dB, +3 dB, +4 dB, +5 dB respectively.

In another exemplary embodiment, one DCI schedules four PUSCH repeated transmissions, and the DCI includes one TPC command field, and the indicated power adjustment is +2 dB. The base station configures a power offset value of 1 dB through high layer signaling or MAC signaling. According to high layer signaling and/or MAC signaling, the four repeated PUSCH transmissions are determined to be divided into two groups, and a group 1 includes the first two PUSCH repeated transmissions, and a group 2 includes the last two PUSCH repeated transmissions; and then the actual TPC commands of the four transmissions are: +2 dB, +2 dB, +3 dB, +3 dB respectively.

In an exemplary embodiment, in a case where a beam, spatial relationship, an antenna port quasi-co-location (QCL) parameter or a TCI state referenced by the second number of uplink transmissions are consistent, according to the TPC command and the power offset value, the transmission powers of the second number of uplink transmissions are determined. The advantage of this design is to avoid performing power enhancement processing on the replaced new beam when the beam is replaced for transmission during repeated transmission, however, the new beam may not need power enhancement.

In an embodiment of the present disclosure, the power offset value has at least one of the following characteristics:

The power offset value is a predetermined value or is configured by higher layer signaling or medium access control layer signaling; the power offset value is used to determine a closed-loop power difference between one transmission and a previous transmission; the power offset value is used to determine the closed-loop power difference between one group of transmissions and a previous group of transmission.

The power offset value corresponding to the first transmission is 0, and the power offset value of each remaining transmission relative to the previous transmission is determined by the power offset value. The previous transmission refers to a transmission whose serial number of transmission is 1 less than that of the current transmission. A serial number of transmission refers to transmission burst, such as transmission occasion.

Groups of transmissions are configured by high-level signaling or medium access control layer signaling. Each group of transmissions corresponds to one power offset value, and a power offset value corresponding to a first group of transmissions are 0, and each remaining group of repeated transmissions relative to the power offset of the previous group of repeated transmissions is determined by the power offset value.

In an embodiment of the present disclosure, the uplink transmissions associated with the same one of the following information and corresponding to the same closed-loop power control serial number share the transmit power control adjustment state: transmit-receive point information; ControlResourceSet pool CORESET pool information; antenna panel information; reference signal resource information; transmission configuration indication state information; beam or beam group information. where, the transmit power control adjustment state is determined by the TPC command.

The above information can be determined by serial numbers corresponding to the respective information. For example: a TRP serial number; a CORESET pool serial number; a panel serial number; a reference signal resource serial number; a TCI state serial number; a beam or beam group serial number. That is, the TRP serial number is used to determine the transmit-receive point information. The CORESET pool serial number is used to determine the ControlResourceSet pool CORESET pool information and so on.

The transmit power control adjustment state is determined by the TPC command. The use of TPC commands includes a cumulative pattern and an absolute value pattern. In the case of the cumulative pattern, the closed-loop power control part of the transmission power is determined by a historical cumulative value of the TPC command; in the case of the absolute value pattern, the closed-loop power control part of the transmission power is only determined by the current TPC command, regardless of the historical TPC value.

In an embodiment of the present disclosure, the uplink transmission is associated with one CORESET pool, including the following: the uplink transmission is scheduled or triggered by downlink control information, and CORESET or search space of PDCCH corresponding to the downlink control information is associated with the CORESET pool.

In a multi-TRP and/or multi-panel scenario, path powers of different panels or TRPs may be very different. Therefore, it is better to set different power control parameters correspondingly to determine different transmission powers. However, in the related art, the number of closed-loop power control serial numbers is limited, which cannot meet setting requirements of multiple power control parameters in the scenario of multiple TRPs and/or multiple panels. In order to solve this problem, in an embodiment of the present disclosure, for multiplex transmission sharing the same closed-loop power control serial number, in the case of different transmit-receive point information, ControlResourceSet pool CORESET pool information, antenna panel information, reference signal resource information, transmission configuration indication state information, and beam or beam group information which are associated with the transmission, the transmit power control TPC command is used to determine the transmission power of uplink transmission related to the different above information.

For example, assuming that PUSCH transmission is associated with TRP1 and TRP2 and supports the same closed-loop power control serial number of 0, the UE maintains the closed-loop power control parameters for the transmissions associated with TRP1 and TRP2 based on the TPC respectively, so as to implement the corresponding setting of different closed-loop power control parameters for TRP1 and TRP2; and then transmission powers of different uplink transmissions are determined according to different closed-loop power control parameters.

For the DCI of the grouped TPC commands, the closed-loop power control serial numbers thereof are also processed into multiple actual closed-loop power control based on the above information.

In an exemplary embodiment, in a S-DCI scenario, when a SRI field included in one DCI indicates multiple SRS resources, the multiple SRS resources are divided into L groups according to the configuration information of the base station, and the base station configures the L groups of SRS resources corresponding to L-channel transmission one to one or according to a predefined or configuration sequence. Alternatively, the base station configures multiple SRS resources corresponding to multiplex transmission one to one in sequence, or according to a predefined or configuration sequence. The multiplex transmission may also correspond to different frequency domain resources, for example, a frequency hopping of one transmission corresponds to multiple different frequency domain resources.

The base station configures the first number of transmit power control TPC commands indicated by the downlink control information, where the first number is an integer greater than or equal to 1, and the downlink control information is transmitted, and the UE obtains the downlink control information, and the transmission powers of the second number of uplink transmissions are determined according to the first number of transmit power control TPC commands indicated by the downlink control information.

In a multi-TRP/multi-panel scenario, when a PHR (Power Headroom Report) of a BWP or a component carrier (CC) is calculated, there may be multiple transmission simultaneous starting in the time slot for calculating the PHR, and the related art does not provide a solution for calculating a PHR in such a scenario. To solve the above problem, an embodiment of the present disclosure provides a method for determining a power headroom report PHR.

In a case where there are more than one uplink transmissions that occupy the same time domain resource in a time period, or there are more than one uplink transmissions with the same starting time, a PHR in the time period is determined by adopting at least one of the following manners:

The PHR in the time period is determined according to a sum of transmission powers of the more than one uplink transmissions with the same starting time; the PHR corresponding to each antenna panel or each transmit-receive point in the time period is determined; the PHR in the time period is determined according to a transmission power of uplink transmission corresponding to each transmit-receive direction; the PHR in the time period is determined according to a parameter associated with the uplink transmission; where, the time period includes at least one time unit, and the time unit includes a time slot, a subframe, a frame or a symbol.

In this embodiment of the present disclosure, a parameter associated with the uplink transmission includes at least one of the following: ControlResourceSet pool CORESET pool information; reference signal resource information; transmission configuration indication state information; a beam serial number or a beam group serial number; a transmit-receive point serial number or a transmit-receive point group serial number; a path loss value; time of downlink control information corresponding to uplink transmission; a value of PHR corresponding to uplink transmission.

Exemplarily, in a case where there are more than one uplink transmissions that occupy the same time domain resource in a time period, or there are multiple uplink transmissions with the same starting time, the PHR in the time period is determined according to a sum of transmission powers of the more than one uplink transmissions.

Alternatively, in a case where there are more than one uplink transmissions that occupy the same time domain resource in a time period, or there are multiple uplink transmissions with the same starting time, the PHR corresponding to each antenna panel or transmit-receive point in the time period is calculated respectively. That is, at least one PHR are included, and each PHR corresponds to one antenna panel or transmit-receive point.

Alternatively, in a case where there are more than one uplink transmissions that occupy the same time domain resource in a time period, or there are multiple uplink transmissions with the same starting time, the PHR in the time period is determined according to a transmission power of uplink transmission corresponding to each transmit-receive point direction.

Alternatively, in a case where there are more than one uplink transmissions that occupy the same time domain resource in a time period, or there are multiple uplink transmissions with the same starting time, the PHR is determined according to a transmission parameter of the uplink transmission having the smallest (or largest) beam serial number or beam group serial number.

Alternatively, in a case where there are more than one uplink transmissions that occupy the same time domain resource in a time period, or there are multiple uplink transmissions with the same starting time, the PHR in the time period is determined according to a transmission parameter of the uplink transmission having the smallest (or largest) path loss value.

Alternatively, in a case where there are more than one uplink transmissions that occupy the same time domain resource in a time period, or there are multiple uplink transmissions with the same starting time, the PHR in the time period is determined according to a transmission parameter of the uplink transmission where the downlink control information corresponding to the uplink transmission has the earliest (or the latest) receiving time Alternatively, in a case where there are more than one uplink transmissions that occupy the same time domain resource in a time period, or there are multiple uplink transmissions with the same starting time, the PHRs corresponding to all uplink transmission are calculated and the largest (or smallest) PHR is taken as the PHR in the time period.

The PHR includes: a real PHR, or a virtual PHR.

Embodiments of the present disclosure provide a method for determining the power headroom report PHR in a case where there are more than one uplink transmissions that occupy the same time domain resource in a time period, or there are multiple uplink transmissions with the same starting time.

Figure 4:
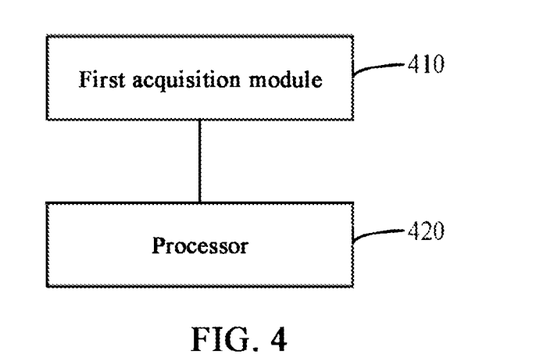
FIG. 4 is a structural block diagram of an apparatus for determining a transmission parameter according to an embodiment of the present disclosure.

FIG. 4 is a structural block diagram of an apparatus for determining a transmission parameter according to an embodiment of the present disclosure. By executing the method for determining the transmission parameter, the apparatus solves the problem that the transmission parameter cannot be determined due to multiple TRPs or panels sharing one SRS resource set. The apparatus may be implemented by software and/or hardware, and is typically configured in the UE. As shown in FIG. 4, the apparatus includes: a first acquisition module 410 and at least one processor 420.

The first acquisition module 410 is configured to acquire a sounding reference signal SRS resource set; the at least one processor 420 is configured to: determine a transmission parameter of uplink transmission according to at least one channel state information reference signal CSI-RS resource in the SRS resource set, where the transmission parameter includes precoding information, and the uplink transmission includes SRS transmission or physical uplink shared channel PUSCH transmission.

The apparatus for determining the transmission parameter provided by an embodiment of the present disclosure is configured to implement the method for determining the transmission parameter in the above embodiments. The implementation principle and technical effect of the apparatus for determining a transmission parameter are similar to the method for determining the transmission parameter, which will not be repeated here.

In an exemplary embodiment, in a case where at least one of the following conditions is satisfied, the maximum value of the number of a channel state information reference signal CSI-RS resource included in the SRS resource set is greater than 1:

The number of ControlResourceSet pools CORESET pools of a first communication node exceeds 1; the ControlResourceSet CORESET of the first communication node includes more than one serial number of different CORESET Pools; the number of transmit-receive points TRPs or the maximum number of TRPs of a second communication node exceeds 1.

In an exemplary embodiment, the at least one channel state information reference signal CSI-RS resource has at least one of the following characteristics:

The CSI-RS resource is a non-zero power channel state information reference signal resource; the CSI-RS resource is associated with setting information, where the setting information comprises one of the following: a SRS resource, a SRS resource group, a ControlResourceSet pool CORESET pool, a CORESET pool group, a CORESET pool serial number, a transmission configuration indication state TCI state, or a TCI state group.

In an exemplary embodiment, the at least one processor is configured to determine the transmission parameter of the uplink transmission according to the at least one CSI-RS resource in the SRS resource set in at least one of the following manners: determining precoding information of uplink transmission corresponding to one SRS resource according to one CSI-RS resource or more than one CSI-RS resource; or determining precoding information of uplink transmission corresponding to a SRS resource according to association relationship between the CSI-RS resource and the setting information.

In an exemplary embodiment, at least one CSI-RS resource in the SRS resource set is determined according to the downlink control information.

In an exemplary embodiment, the at least one CSI-RS resource in the SRS resource set is determined according to the downlink control information, including the following:

A target SRS resource set is determined according to a SRS request field in the downlink control information; and the at least one CSI-RS resource is determined according to a CSI-RS resource configured in the target SRS resource set.

In an exemplary embodiment, in the case where the CSI-RS resource is aperiodic, the at least one CSI-RS resource and the downlink control information including the SRS request field are in the same time unit.

In an exemplary embodiment, in a case where resources occupied by more than one CSI-RS resources in one time slot are overlapped, the more than one CSI-RS resources are allocated to different time units according to a sequence of serial numbers of the CSI-RS resources.

In an exemplary embodiment, in a case where a time interval between reception time of a last symbol of at least one CSI-RS resource in the SRS resource set and start time of SRS transmission is less than a predetermined time interval, precoding information of the SRS transmission remains unchanged.

In an exemplary embodiment, in the case where the SRS resource set is periodic or semi-persistent, the at least one CSI-RS resource is configured by higher layer signaling.

In an exemplary embodiment, a RE position occupied by the at least one CSI-RS resource is not conflict.

Figure 5:
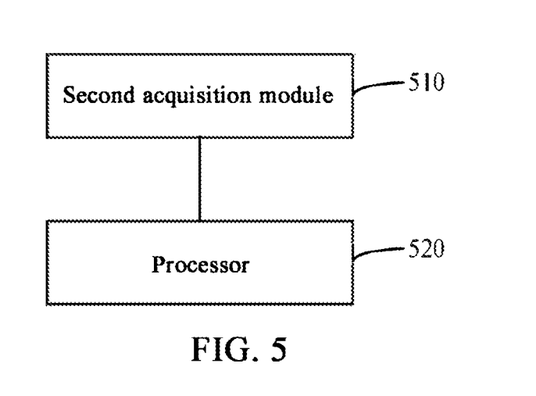
FIG. 5 is a structural block diagram of an apparatus for determining a transmission power according to an embodiment of the present disclosure.

FIG. 5 is a structural block diagram of an apparatus for determining a transmission power according to an embodiment of the present disclosure. By executing the method for determining a transmission power, the apparatus solves the problem that the S-DCI only including one TPC cannot be directly used to determine the transmission power of a multi-TRP/panel scenario. The apparatus may be implemented by software and/or hardware, and is typically configured in the UE. As shown in FIG. 5, the apparatus includes: a second acquisition module 510 and at least one processor 520.

The second acquisition module 510 is configured to acquire downlink control information. The at least one processor 520 is configured to: determine transmission powers of a second number of uplink transmissions according to a first number of transmit power control TPC commands indicated by the downlink control information, where the uplink transmission includes PUSCH transmission, PUCCH transmission, or SRS transmission.

The apparatus for determining a transmission power provided by an embodiment of the present disclosure is configured to implement the method for determining the transmission power in the above embodiments. The implementation principle and technical effect of the apparatus for determining a transmission power are similar to the method for determining the transmission power, which will not be repeated here.

In an exemplary embodiment of the present disclosure, the second number of uplink transmissions have at least one of the following characteristics:

The second number of uplink transmissions are scheduled or triggered by the same downlink control information; the second number of uplink transmissions include time-domain repeated uplink transmission; the second number of uplink transmissions include uplink transmissions occupying or associated with different transmission resources.

In an exemplary embodiment of the present disclosure, the transmission powers of the second number of uplink transmissions are determined according to the first number of transmission power command TPC commands indicated by the downlink control information, including one of the following:

A transmission power of a respective uplink transmission is determined according to each TPC command; transmission powers of each of the second number of uplink transmissions are determined according to the TPC command; it is determined that one or a group of the second number of uplink transmissions use the TPC command to determine a transmission power, and transmission powers of the remaining uplink transmissions are determined according to a TPC command being 0; the second number of uplink transmissions include a first number of groups, and a transmission power of a respective group of uplink transmissions is determined according to each TPC command; it is determined that a first number or a first group of the second uplink transmissions use the TPC command to determine a transmission power, and transmission powers of the remaining uplink transmissions are determined according to a TPC command being 0.

In an exemplary embodiment of the present disclosure, the transmission powers of the second number of uplink transmissions are determined according to the first number of transmission power command TPC commands indicated by the downlink control information, including one of the following:

In a case where the first number is equal to the second number, a transmission power of a respective uplink transmission is determined according to each TPC command; in a case where the first number is equal to 1, a transmission power of each uplink transmission of the second number of uplink transmissions according to the TPC command; in a case where the first number is equal to 1, it is determined that one or a group of uplink transmissions of the second number of uplink transmissions use the TPC command to determine a transmission power, and transmission powers of the remaining uplink transmissions are determined according to a TPC command being 0; in a case where the first number is less than the second number, the second number of uplink transmissions include a first number of groups of uplink transmissions, a transmission power of a respective group of uplink transmissions is determined according to each TPC command; in a case where the first number is less than the second number, it is determined that a first number or a first number group of uplink transmissions of the second number of uplink transmissions use the TPC command to determine a transmission power, and transmission powers of the remaining uplink transmissions are determined according to a TPC command being 0.

In an exemplary embodiment of the present disclosure, it is determined that the one or one group of uplink transmissions of the second number of uplink transmissions use the TPC command to determine the transmission power according to at least one of the following manners: a serial number of the uplink transmission; a transmission resource of the uplink transmission; a transmission resource of the downlink control information scheduling or triggering the uplink transmission; a search space serial number or a serial number of a ControlResourceSet pool CORESET pool to which the downlink control information scheduling or triggering the uplink transmission belongs; a closed-loop power control serial number of the downlink control information scheduling or triggering the uplink transmission.

In an exemplary embodiment of the present disclosure, the transmission resource includes one of the following: a time domain resource, a frequency domain resource, a spatial domain resource, transmission precoding information, a beam state, reference signal resource information, spatial relation information, a transmission configuration indication TCI state information.

In an exemplary embodiment, transmission powers of a second number of uplink transmissions are determined according to the TPC command and the power offset value.

In an exemplary embodiment, in a case where a beam, spatial relationship, an antenna port quasi-co-location (QCL) parameter or a TCI state referenced by the second number of uplink transmissions are consistent, the transmission powers of the second number of uplink transmissions are determined according to the TPC command and the power offset value.

In an exemplary embodiment, the power offset value has at least one of the following characteristics:

The power offset value is a predetermined value or is configured by higher layer signaling or medium access control layer signaling; the power offset value is used to determine a closed-loop power difference between one transmission and a previous transmission; the power offset value is used to determine the closed-loop power difference between one group of transmissions and a previous group of transmission.

In an exemplary embodiment, the uplink transmissions associated with the same one of the following information and corresponding to the same closed-loop power control number share the transmit power control adjustment state: transmit-receive point information; ControlResourceSet pool CORESET pool information; antenna panel information; reference signal resource information; transmission configuration indication state information; beam or beam group information where the transmit power control adjustment state is determined by the TPC command.

Embodiments of the present disclosure further provide an apparatus for determining a power headroom report PHR and the apparatus may be implemented by software and/or hardware, and is typically integrated in the UE. The apparatus includes at least one processor.

In a case where there are more than one uplink transmissions that occupy the same time domain resource in one time period, or there are more than one uplink transmissions with the same starting time, the at least one processor is configured to determine a PHR in the time period by adopting at least one of the following manners: determining the PHR in the time period according to a sum of transmission powers of the more than one uplink transmissions; determining the PHR corresponding to each antenna panel or each TRP in the time period; determining the PHR in the time period according to a transmission power of uplink transmission corresponding to each TRP direction; determining the PHR in the time period according to a parameter associated with the uplink transmission; where, the time period includes at least one time unit, and the time unit includes a time slot, a subframe, a frame or a symbol.

The apparatus for determining a power headroom report PHR provided by an embodiment of the present disclosure is configured to implement the method for determining a power headroom report PHR in the above embodiments. The implementation principle and technical effect of the apparatus for determining a power headroom report PHR are similar to the method for determining a power headroom report PHR, which will not be repeated here.

In an exemplary embodiment, a parameter associated with the uplink transmission includes at least one of the following: ControlResourceSet pool CORESET pool information; reference signal resource information; transmission configuration indication state information; a beam serial number or a beam group serial number; a transmit-receive point serial number or a transmit-receive point group serial number; a path loss value; time of downlink control information corresponding to uplink transmission; a value of PHR corresponding to uplink transmission.

Embodiments of the present disclosure further provide a storage medium executing instructions, and the storage mechanism stores a computer program, and the computer program implements the method described in an embodiment of the present disclosure when executed by the processor.

The term user equipment (UE) covers any suitable type of wireless user equipment, such as a mobile telephone, a portable data processing device, a portable web browser or a vehicle mounted mobile station.

In general, the various embodiments of the present disclosure may be implemented in hardware or special purpose circuits, software, logic, or any combination thereof. For example, some aspects may be implemented in hardware, while other aspects may be implemented in firmware or software that may be executed by a controller, microprocessor or other computing device, although the present disclosure is not limited so.

Embodiments of the present disclosure may be implemented by the execution of computer program instructions by a data processor of a mobile device, e.g., in a processor entity, or by hardware, or by a combination of software and hardware. Computer program instructions may be assembly instructions, Instruction Set Architecture (ISA) instructions, machine instructions, machine dependent instructions, microcode, firmware instructions, state setting data, or written in any combination of one or more programming languages source or object code.

The block diagrams of any logic flow in the figures of this disclosure may represent program steps, or may represent interconnected logic circuits, modules and functions, or may represent a combination of program steps and logic circuits, modules and functions. Computer programs can be stored on memory. The memory may be of any type suitable for the local technical environment and may be implemented using any suitable data storage technology, such as, but not limited to, Read-Only Memory (ROM), Random Access Memory (RAM), optical Memory devices and systems (Digital Video Disc (DVD) or Compact Disk (CD)), etc. Computer-readable media may include non-transitory storage media. The data processor can be any type suitable for the local technical environment, such as but not limited to a general purpose computer, a special purpose computer, a microprocessor, a digital signal processor (Digital Signal Processing, DSP), an application specific integrated circuit (ASIC)), programmable logic devices (Field-Programmable Gate Array, FPGA) and processors based on multi-core processor architecture.

We claim:

1. A method for determining a transmission power, comprising:
   acquiring downlink control information; and
   determining transmission powers of a second number of uplink transmissions according to a first number of transmit power control (TPC) commands indicated by the downlink control information, wherein an uplink transmission comprises physical uplink shared channel (PUSCH) transmission, physical uplink control channel (PUCCH) transmission, or sounding reference signal (SRS) transmission;
   the second number of uplink transmissions having the following characteristics:
   the second number of uplink transmissions are scheduled or triggered by a same downlink control information; and
   the second number of uplink transmissions comprise uplink transmissions occupying or associated with different transmission resources,
   wherein determining the transmission powers of the second number of uplink transmissions according to the first number of TPC commands indicated by the downlink control information comprises:
   in a case where the second number of uplink transmissions comprise a first number of groups, determining transmission powers of a respective group of uplink transmissions corresponding to each TPC command, according to the each TPC command; and
   in a case where the first number is equal to 1, determining a transmission power of each uplink transmission of the second number of uplink transmissions, according to the TPC command.

2. The method according to claim 1, wherein the second number of uplink transmissions further have the following characteristic: the second number of uplink transmissions comprise time-domain repeated uplink transmissions.

3. The method according to claim 1, wherein determining the transmission powers of the second number of uplink transmissions according to the first number of TPC commands indicated by the downlink control information comprises one of the following:
   determining a transmission power of one uplink transmission corresponding to each TPC command, according to the each TPC command;
   determining a transmission power of each uplink transmission of the second number of uplink transmissions, according to the TPC commands;
   determining that one or one group of uplink transmissions of the second number of uplink transmissions use the TPC commands to determine transmission power, and determining the transmission powers of remaining uplink transmissions according to a TPC command being 0; and
   determining that a first number or a first number group of uplink transmissions of the second number of uplink transmissions use the TPC commands to determine transmission power, and determining the transmission powers of remaining uplink transmissions according to a TPC command being 0.

4. The method according to claim 1, wherein determining the transmission powers of the second number of the uplink transmissions according to the first number of TPC commands indicated by the downlink control information comprises one of the following:
   in a case where the first number is equal to the second number, determining a transmission power of uplink transmission corresponding to each TPC command, according to the each TPC command;
   in a case where the first number is equal to 1, determining that one or one group of uplink transmissions of the second number of uplink transmissions use the TPC command to determine transmission power, and determining transmission powers of remaining uplink transmissions according to a TPC command being 0;
   in a case where the first number is less than the second number, the second number of uplink transmissions comprising a first number of groups, determining transmission powers of a respective group of uplink transmissions corresponding to each TPC command, according to the each TPC command; and
   in a case where the first number is less than the second number, determining that a first number or a first number group of uplink transmissions of the second number of uplink transmissions use the TPC commands to determine transmission power, and determining transmission powers of remaining uplink transmissions, according to a TPC command being 0.

5. The method according to claim 3, wherein, determining that the one or one group of uplink transmissions of the second number of uplink transmissions use the TPC commands to determine the transmission powers-power, according to at least one of the following:
   a serial number of the uplink transmission;
   a transmission resource of the uplink transmission;
   a transmission resource of downlink control information scheduling or triggering the uplink transmission;
   a search space serial number or a serial number of a ControlResourceSet pool (CORESET pool) to which downlink control information scheduling or triggering the uplink transmission belongs; and a closed-loop power control serial number of downlink control information scheduling or triggering the uplink transmission.

6. The method according to claim 1, wherein the transmission resources comprise at least one of the following:
a time domain resource, a frequency domain resource, a spatial domain resource, transmission precoding information, beam state, reference signal resource information, spatial relationship information, and a transmission configuration indication state (TCI state) information.

7. The method according to claim 1, further comprising:
determining the transmission powers of the second number of uplink transmissions, according to the TPC commands and a power offset value.

8. The method according to claim 1, further comprising:
in a case where beams, spatial relationship, antenna port quasi-co-located (QCL) parameters, or TCIs state referenced by the second number of uplink transmissions are consistent, determining the transmission powers of the second number of uplink transmissions, according to the TPC commands and a power offset value.

9. The method according to claim 7, wherein the power offset value has at least one of the following characteristics:
the power offset value is a predetermined value or is configured by higher layer signaling or medium access control layer signaling;
the power offset value is used to determine a closed-loop power difference between one transmission and a previous transmission; and
the power offset value is used to determine a closed-loop power difference between one group of transmissions and a previous group of transmissions.

10. The method according to claim 1, wherein the second number of uplink transmissions are associated with a same one of the following information and correspond to a same closed-loop power control serial number sharing a transmission power control adjustment state, wherein the transmission power control adjustment state is determined by the TPC commands:
transmit-receive point information;
CORESET pool information;
antenna panel information;
reference signal resource information;
transmission configuration indication state information; and
beam or beam group information.

11. A non-transitory storage medium storing a computer program, wherein when executed by a processor, the computer program performs:
acquiring downlink control information; and
determining transmission powers of a second number of uplink transmissions according to a first number of transmit power control (TPC) commands indicated by the downlink control information, wherein an uplink transmission comprises physical uplink shared channel (PUSCH) transmission, physical uplink control channel (PUCCH) transmission, or sounding reference signal (SRS) transmission;
the second number of uplink transmissions having the following characteristics:
the second number of uplink transmissions are scheduled or triggered by a same downlink control information; and
the second number of uplink transmissions comprise uplink transmissions occupying or associated with different transmission resources,
wherein determining the transmission powers of the second number of uplink transmissions according to the first number of TPC commands indicated by the downlink control information comprises:
in a case where the second number of uplink transmissions comprise a first number of groups, determining transmission powers of a respective group of uplink transmissions corresponding to each TPC command, according to the each TPC command; and
in a case where the first number is equal to 1, determining a transmission power of each uplink transmission of the second number of uplink transmissions, according to the TPC command.

12. The method according to claim 8, wherein the power offset value has at least one of the following characteristics:
the power offset value is a predetermined value or is configured by higher layer signaling or medium access control layer signaling;
the power offset value is used to determine a closed-loop power difference between one transmission and a previous transmission; and
the power offset value is used to determine a closed-loop power difference between one group of transmissions and a previous group of transmissions.

13. An apparatus for determining a transmission power, comprising:
a second acquisition module, which is configured to acquire downlink control information; and
at least one processor, which is configured to: determine transmission powers of a second number of uplink transmissions, according to a first number of transmission power control (TPC) commands indicated by the downlink control information, wherein an uplink transmission of the second number of uplink transmissions comprises physical uplink shared channel (PUSCH) transmission, physical uplink control channel (PUCCH) transmission, or sounding reference signal (SRS) transmission,
the second number of uplink transmissions having the following characteristics:
the second number of uplink transmissions are scheduled or triggered by a same downlink control information; and
the second number of uplink transmissions comprise uplink transmissions occupying or associated with different transmission resources,
wherein determining the transmission powers of the second number of uplink transmissions according to the first number of TPC commands indicated by the downlink control information comprises:
in a case where the second number of uplink transmissions comprise a first number of groups, determining transmission powers of a respective group of uplink transmissions corresponding to each TPC command, according to the each TPC command; and
in a case where the first number is equal to 1, determining a transmission power of each uplink transmission of the second number of uplink transmissions, according to the TPC command.

14. The non-transitory storage medium storing a computer program according to claim 11, wherein the transmission resources comprise at least one of the following:
a time domain resource, a frequency domain resource, a spatial domain resource, transmission precoding information, beam state, reference signal resource information, spatial relationship information, and a transmission configuration indication state (TCI state) information.

15. The non-transitory storage medium according to claim 11, wherein the second number of uplink transmissions further have the following characteristic:
the second number of uplink transmission comprise time-domain repeated uplink transmission.

16. The non-transitory storage medium according to claim 14, wherein determining the transmission powers of the second number of uplink transmissions according to the first number of TPC commands indicated by the downlink control information comprises one of the following:
determining a transmission power of one uplink transmission corresponding to each TPC command, according to the each TPC command;
determining a transmission power of each uplink transmission of the second number of uplink transmissions, according to the TPC commands;
determining that one or one group of uplink transmissions of the second number of uplink transmissions use the TPC commands to determine transmission power, and determining the transmission powers of remaining uplink transmissions according to a TPC command being 0; and
determining that a first number or a first number group of uplink transmissions of the second number of uplink transmissions use the TPC commands to determine transmission power, and determining the transmission powers of remaining uplink transmissions according to a TPC command being 0.

17. The non-transitory storage medium according to claim 14, wherein determining the transmission powers of the second number of the uplink transmissions according to the first number of TPC commands indicated by the downlink control information comprises one of the following:
in a case where the first number is equal to the second number, determining a transmission power of uplink transmission corresponding to each TPC command, according to the each TPC command;
in a case where the first number is equal to 1, determining that one or one group of uplink transmissions of the second number of uplink transmissions use the TPC command to determine transmission power, and determining the transmission powers of remaining uplink transmissions according to a TPC command being 0;
in a case where the first number is less than the second number, the second number of uplink transmissions comprising a first number of groups, determining the transmission powers of a respective group of uplink transmissions corresponding to each TPC command, according to the each TPC command; and
in a case where the first number is less than the second number, determining that a first number or a first number group of uplink transmissions of the second number of uplink transmissions use the TPC commands to determine transmission power, and determining the transmission powers of remaining uplink transmissions, according to a TPC command being 0.

18. The non-transitory storage medium according to claim 16, wherein, determining that the one or one group of uplink transmissions of the second number of uplink transmissions use the TPC commands to determine transmission power, according to at least one of the following:
a serial number of the uplink transmission;
a transmission resource of the uplink transmission;
a transmission resource of downlink control information scheduling or triggering the uplink transmission;
a search space serial number or a serial number of a ControlResourceSet pool (CORESET pool) to which downlink control information scheduling or triggering the uplink transmission belongs; and
a closed-loop power control serial number of downlink control information scheduling or triggering the uplink transmission.

19. The non-transitory storage medium according to claim 15, wherein the transmission resources comprise at least one of the following:
a time domain resource, a frequency domain resource, a spatial domain resource, transmission precoding information, beam state, reference signal resource information, spatial relationship information, and a transmission configuration indication state (TCI state) information.

20. The non-transitory storage medium according to claim 14, wherein the computer program further performs:
determining the transmission powers of the second number of uplink transmissions, according to the TPC commands and a power offset value.

* * * * *

UNITED STATES PATENT AND TRADEMARK OFFICE
CERTIFICATE OF CORRECTION

PATENT NO. : 12,356,335 B2
APPLICATION NO. : 17/800854
DATED : July 8, 2025
INVENTOR(S) : Ke Yao et al.

Page 1 of 1

It is certified that error appears in the above-identified patent and that said Letters Patent is hereby corrected as shown below:

In the Claims

Column 27; Line 7:
Delete "number of uplink transmission"
Replace with --number of uplink transmissions--

Signed and Sealed this
Sixteenth Day of September, 2025

Coke Morgan Stewart
*Acting Director of the United States Patent and Trademark Office*